US008924460B2

(12) United States Patent
Collet et al.

(10) Patent No.: US 8,924,460 B2
(45) Date of Patent: Dec. 30, 2014

(54) METHOD AND SYSTEM OF ADMINISTRATING A PEER-TO-PEER FILE SHARING NETWORK (75) Inventors: Jean-Luc Collet, La Gaude (FR); Beatrice Coulomb, Cagnes sur Mer (FR); Francois-Xavier Drouet, La Gaude (FR); Carole Truntschka, Saint-Laurent-du-Var (FR)

(73) Assignee: International Business Machines Corporation, Armonk, NY (US)

( * ) Notice: Subject to any disclaimer, the term of this patent is extended or adjusted under 35 U.S.C. 154(b) by 820 days.

(21) Appl. No.: 12/640,434

(22) Filed: Dec. 17, 2009

(65) Prior Publication Data

US 2010/0161752 A1    Jun. 24, 2010

(30) Foreign Application Priority Data

Dec. 19, 2008 (EP) .................................... 08305984

(51) Int. Cl.
*G06F 15/16* (2006.01)
*H04L 29/08* (2006.01)

(52) U.S. Cl.
CPC ............... *H04L 67/104* (2013.01); *H04L 67/06* (2013.01)
USPC ........................... 709/202; 709/204; 709/230

(58) Field of Classification Search
USPC .................. 709/202–205, 216–218, 230–231
See application file for complete search history.

(56) References Cited

U.S. PATENT DOCUMENTS

| 7,133,368 | B2 | 11/2006 | Zhang et al. | |
| 7,443,803 | B2 | 10/2008 | Su et al. | |
| 2005/0152364 | A1 | 7/2005 | Tagami et al. | |
| 2005/0152367 | A1* | 7/2005 | Park et al. | 370/390 |
| 2006/0215575 | A1 | 9/2006 | Horton et al. | |
| 2007/0028133 | A1* | 2/2007 | Izutsu et al. | 714/4 |
| 2008/0205291 | A1* | 8/2008 | Li et al. | 709/231 |
| 2008/0259793 | A1 | 10/2008 | Bauer et al. | |
| 2009/0182815 | A1* | 7/2009 | Czechowski et al. | 709/231 |
| 2009/0327244 | A1* | 12/2009 | Rizal | 709/204 |

* cited by examiner

*Primary Examiner* — Patrice Winder
(74) *Attorney, Agent, or Firm* — Douglas A. Lashmit; Hoffman Warnick LLC (57) ABSTRACT A computer-implemented method, system, and computer program product for administering a peer-to-peer file sharing computer network. The method includes: maintaining a reference associating a particular shared file with a seeder in a community of peers and a number of seeders in the community; and registering a second peer as a second seeder of the particular shared file, if a first seeder in the community of peers has informed the peers of a termination of the availability of a file seeding of the particular shared file. The system includes means for performing the steps of the method. The computer program product includes computer program instructions for carrying out the steps of the method.

19 Claims, 5 Drawing Sheets

| Content Identifier (HashCode) | Content coordinates | Status (active, deletion requested, copy requested) | Communities UID | Copy / delete Timestamp Dd/mm/yy Hh/mm/ss | Content owners |
|---|---|---|---|---|---|
| 12345489 | /PC-Obama/ftp: Mozart.mp3 | Active | ClassicMusic, Mozart, ... | 18/11/2008 06:00:00 | Smith Obama Veltz |
| ... | ... | ... | ... | ... | ... |

METHOD AND SYSTEM OF ADMINISTRATING A PEER-TO-PEER FILE SHARING NETWORK

CROSS-REFERENCE TO RELATED APPLICATIONS

This application claims priority under 35 U.S.C. §119 to European Patent Application No. 08305984.0 filed Dec. 19, 2008, the entire contents of which are incorporated by reference herein.

BACKGROUND OF THE INVENTION

1. Field of the Invention

The present invention relates generally to data processing, and more particularly to a method and system of administrating a peer-to-peer file sharing network.

2. Description of the Related Art

In the last few years, exchanges over peer-to-peer (P2P) networks or loosely coupled networks have exploded. Most of the Internet traffic today is P2P traffic.

File sharing refers to sending and receiving digital files over a network, usually following the peer-to-peer (P2P) model, where the files are stored on and served by personal computers of the users. Most people who engage in file sharing on the Internet both send (upload) files and receive files (download). P2P file sharing is distinct from file trading in that downloading files from a P2P network does not require uploading, although some networks either provide incentives for uploading such as credits or force the sharing of files being currently downloaded.

The first generation of peer-to-peer file sharing networks was a centralized server system. A user would send a search to the centralized server of what they were looking for. The server then sends back a list of peers that have the data and facilitates the connection and download. The second generation was about decentralization: a network without a central index server, with some nodes being 'more equal than others'; searches are passed along nodes. The third generation of peer-to-peer networks are those that have anonymity features built in, sometimes using TOR (onion routing); proxies used for other users' IP addresses make it hard to determine who is downloading. The fourth P2P-Generation deals with streams over P2P (not only files), for example with video or television streams.

Peer-to-peer file sharing protocols are used to distribute large amounts of data. Compared to standard internet hosting, this kind of protocol provides a significant reduction in the original distributor's hardware and bandwidth resource costs. It also provides redundancy against system problems and reduces dependence on the original distributor. The protocol received a huge success (this is sometimes called "super-distribution").

Users, nodes or peers share so-called "torrents". A "torrent" is a file which contains metadata about the files to be shared and about the tracker, the computer that coordinates the file distribution. The tracker maintains lists of the clients currently participating in the torrent. Alternatively, in a trackerless system (decentralized tracking) every peer acts as a tracker. The peer distributing a data file treats the file as a number of identically-sized pieces, typically between 64 Kb and 4 Mb each. The peer creates a checksum for each piece, using the SHA1 hashing algorithm, and records it in the torrent file. When another peer later receives a particular piece, the checksum of the piece is compared to the recorded checksum to test that the piece is error-free. The initial distributor of the complete file or collection acts as the first seed.

The latest P2P software clearly shows that content management, generally speaking, is very poorly addressed. This is not surprising because publishers are not involved in organizing the offer. Content management is also poorly addressed in other aspects. For example the shared folders features of software like MSN Messenger do not have a content management mechanism. As a result, it happens frequently that some files are not available on the network anymore since there is no seeder of this file in the network.

There have been many attempts to enhance current widely used systems. For example, in response to polluting attacks (e.g. inserting "bad" chunks/packets into an otherwise valid file on the network), some users have developed so-called private P2P file sharing software. There are some "P2G" (peer-to-group) solutions to optimize the streaming or the share of contents for a group of users (a community). "Trust" is the master word in those systems; but content management in fine relies on users' behaviors (as in open P2P networks). The organization remains dependent on users. "Social storage platform" have also emerged; branded as "peer-to-peer virtual hard-drive", shared part of hard drives are consolidated on a worldwide scale. It creates a virtual hard drive in which users may save files. Users never share actual hard drives but simply a very small percentage of their available free space. Users then share disk space rather than specific files. Content management in this kind of system is a real challenge. There is no mention of it other than classifying documents (hierarchy of folders). It is also possible to mention "grid systems" (secured, distributed and fault tolerant routing system), providing cache features; in these systems, any server may create a local replica of any data object. These local replicas provide faster access and robustness to network partitions. They also reduce network congestion. But the use of replicas reduces globally the efficiency of storage, mainly because it is poorly tied to actual demands. There are many other systems for exchanging data between peers. Sometimes users exchange complete hard drives, from hand to hand. But all these systems and methods fail to provide satisfactory content management mechanisms.

Existing content management systems in peer-to-peer networks target quality of service (QoS) and do not effectively address problems related to the content management aspects.

For example, issued U.S. Pat. No. 7,133,368, entitled "Peer-to-peer method of quality of service (QoS) probing and analysis," discloses a peer-to-peer (P2P) probing/network quality of service (QoS) analysis system which utilizes a UDP-based probing tool for determining latency, bandwidth, and packet loss ratio between peers in a network. The probing tool enables network QoS probing between peers that connect through a network address translator. The list of peers to probe is provided by a connection server based on prior probe results and an estimate of the network condition. The list includes those peers which are predicted to have the best QoS with the requesting peer. Once the list is obtained, the requesting peer probes the actual QoS to each peer on the list, and returns these results to the connection server. P2P probing in parallel using a modified packet-pair scheme is utilized. If anomalous results are obtained, a hop-by-hop probing scheme is utilized to determine the QoS of each link. In such a scheme, differential destination measurement is utilized. In the patent, Col 3 lines (1-67) and Col 5 lines (1-8) disclose that in the QoS analysis and prediction phase, the Connection Server (CS) utilizes the QoS information collected by and sent to it from the peers in the first phase. The CS groups related information from various peers, obtains discriminative features which can characterize the critical path QoS parameters, and extracts useful temporal information from the data. This information is then combined to obtain the statistical model of the network. This information is used once a request is received from a peer to return a list of suitable peers for connection thereto. The model described in the patent thus is limited to a designation of particular peers for sharing contents.

Similarly, patent application US20060215575, entitled "System and method for monitoring and reacting to peer-to-peer network metrics," discloses that the overall health of a peer-to-peer network may be inferred from statistics gathered and analyzed pertaining to individual node and node-to-node performance within the peer-to-peer network. When used with simulations for development or testing, the health statistic may be used instead of or to supplement standard regression testing to determine whether or not changes made improve system performance. When used with live peer-to-peer networks, the health statistic may provide a real-time view into network performance. Such a view may be used to adjust peer-to-peer network topology or to isolate underperforming or malicious nodes. The model described in the patent thus still not offers a practical solution.

Patent application US20050152364, entitled "Traffic control system of P2P network," provides a traffic control system which adapts P2P traffic to the circuit capacity and topology of a physical network. In a traffic control portion, a correspondent node identifying portion monitors the header of a packet exchanged by each P2P traffic and identifies the attribute of a correspondent node. A monitoring object extracting portion extracts a P2P connection based on the identification result. A traffic amount measuring portion obtains the total amount of each P2P traffic which is a monitoring object. A connection selecting portion selects a connection which should be shut down based on the total traffic amount. A filter portion shuts down the shut-down object connection selected by the connection selecting portion of the traffic monitoring portion.

Issued U.S. Pat. No. 7,443,803B2, entitled "Estimating and managing network traffic," discloses that network traffic may be estimated using samples of network activities to identify traffic parameters. A model of the network may be generated using the traffic parameters, and the model can be used to simulate the network using a modified set of parameters. Network traffic may be managed using the results of the simulation. Network traffic can also be managed by intercepting and modifying a control message on a peer-to-peer network.

Patent application US20080259793, entitled "Network traffic control in peer-to-peer environments," discloses a method and an electronic unit for controlling traffic on a network, especially for controlling peer-to-peer related traffic. A filter unit is intercepting messages related to peer-to-peer application from a network line, irrespective of the messages' destination, a control logic then manages a request represented by an intercepted message subject to its content and subject to peering specific information.

None of these documents (or existing P2P software) disclose efficient content management methods or systems. As such, there is a need for a method providing content management via P2P networks.

SUMMARY OF THE INVENTION

According to one embodiment of the present invention a computer-implemented method is provided for administering a peer-to-peer file sharing network. The method includes: maintaining a reference associating a particular shared file with one or more seeders in a community of peers and a number of seeders; registering a second peer as a second seeder of the particular shared file, if a first seeder in the community of peers has informed the peers of a termination of the availability of a file seeding of the particular shared file.

According to another embodiment of the invention, a computer-implemented system is provided for administering a peer-to-peer file sharing computer network. The system includes: means for maintaining a reference associating a particular shared file with a seeder in a community of peers and a number of seeders in the community; and means for registering a second peer as a second seeder of the particular shared file, if a first seeder in the community of peers has informed the peers of the termination of the availability of a file seeding of the particular shared file.

According to yet another embodiment of the invention, a computer program product is provided for administering a peer-to-peer file sharing computer network. The computer program product includes computer program instructions for carrying out the steps of the method for administering a peer-to-peer file sharing computer network.

DETAILED DESCRIPTION OF PREFERRED EMBODIMENTS

The following text presents a detailed embodiment in the context of content management in P2P internet networks but it is to be understood that it is not limited to this specific domain and that it extends equally to domains such as exchanges between mobile phones or in corporate intranets. It is intended to cover the exchange of all kinds of files: music, videos, documents, databases, 3D models, etc.

As a definition, the "peer-to-peer" expression is to be understood as a way to refer to any type of loosely coupled networks. Expressions such as "peer", "peer-to-peer client", "node", or "client" have to be broadly understood as corresponding to a user (human being or bot, individual or group, network or sub network, etc) generally equipped with software adapted or designed for file sharing or download/upload purposes. In the description "peer" and "node" are synonyms. The words "owner" and "seeder" refer to the same concepts. A "seeder" is a node which shares its files (enabling uploading). An "owner", as understood by the present disclosure, does its best to maintain its status as "seeder".

Figure 1:
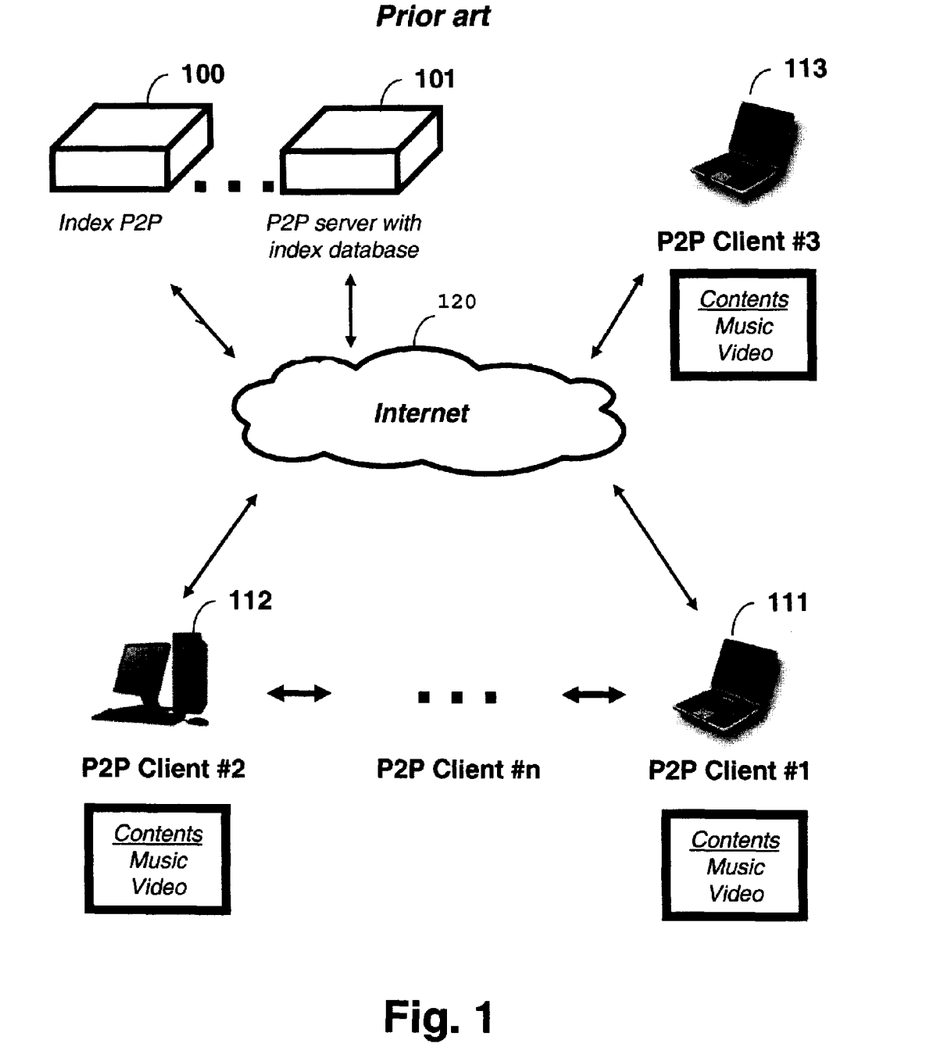
FIG. 1 depicts the existing P2P file sharing system.

Referring to FIG. 1, an example of existing P2P systems is shown. The figure shows peer-to-peer clients and servers. Specifically, the figure shows an indefinite number of n peer-to-peer clients that are interacting with each other (following the main paradigm of the P2P file sharing) and (optionally) with servers 100 or 101. The number n varies over time, nodes joining or leaving the network overt time. The figure shows three particular nodes 111, 112, 113. All communications occur via the Internet network 120 in this example (any other network can be used, including mobile telephony network).

There are three types of P2P networks: centralized, hybrid and pure P2P systems. Centralized P2P networks (such as MP3.com) rely on a centralized index server 100 and a centralized file data storage. Hybrid P2P rely on a centralized index server but the storage is no more centralized. In pure P2P networks, the repository of files index and the storage of files are decentralized, meaning that every P2P client can act as an index server 101 for other peers. A P2P client searching for a given file connects to an index server (100 or 101). The index server (100 or 101) collects all the files shared by the requester and updates its index database 101. It then propagates the request to the nearest (using the TTL metrics) other index servers (if it doesn't reference the requested file) and based on the gathering of all the response the client choose the peers with the best QoS (mainly response time, etc.) using ping mechanisms. Most of the P2P actually used are pure P2P network based.

The server 100 is optional. In P2P systems including servers (centralized models), the server 100 is an intermediary which maintains an index of files of nodes. It enables the creation of peer connections (it connects a first peer to a second peer); in some other models of P2P networks (decentralized models) there are no such servers and messages are passed along peers or nodes. The server 100 can be attached to cache server (to speed-up transfer rates).

These kinds of existing peer-to-peer file sharing networks are characterized by a main distinguishing feature: they are "open" networks; in other words, any new client, provided it comes with compliant software (protocols, etc), can join the networks. Content can be shared on a non-discriminatory basis. If the response time of some nodes are low, some others nodes may present high response time, high transfer rate, etc. In some P2P networks, some performance nodes will be elected to "super-nodes", gaining some functionalities and privileges or duties. In such prior art systems (as shown in FIG. 1), on average, files will be shared with a good performance but depending on networking and nodes' conditions peak performance will be very variable (file can indicate a very high transfer rate during a short moment, then the transfer will enormously slow down, then regain strength, etc.). At any time, a node can quit the P2P network; in this case, the files of the node—which were currently in download and in upload—will not be available in the network anymore. In average, provided there is a high number of users and a high duplication of the same shared files, the system is robust to such phenomenon of users joining and leaving the network all the time. This is the case, for example, with cinema blockbusters (users share video or music hits globally at the same time). But when a particular shared file is a rare file (for example a very old jazz song), where there exists only a small number of such files in the network, this phenomenon endangers the efficiency of sharing because seeders may not be online in a sufficient manner. It also frequently happens that a particular file completely disappears from the network: the file still exists somewhere on a hard drive but it isn't placed into "shared folders" (i.e. folders whose content is agreed to be shared with others, freely or in catalogue with DRM mechanisms).

To conclude on existing networks, the users are exchanging content via P2P solutions but these solutions are not taking into account network topology and sometimes there is a duplication of a lot of content. There are no available solutions to optimize the operators' networks and the response time.

Figure 2:
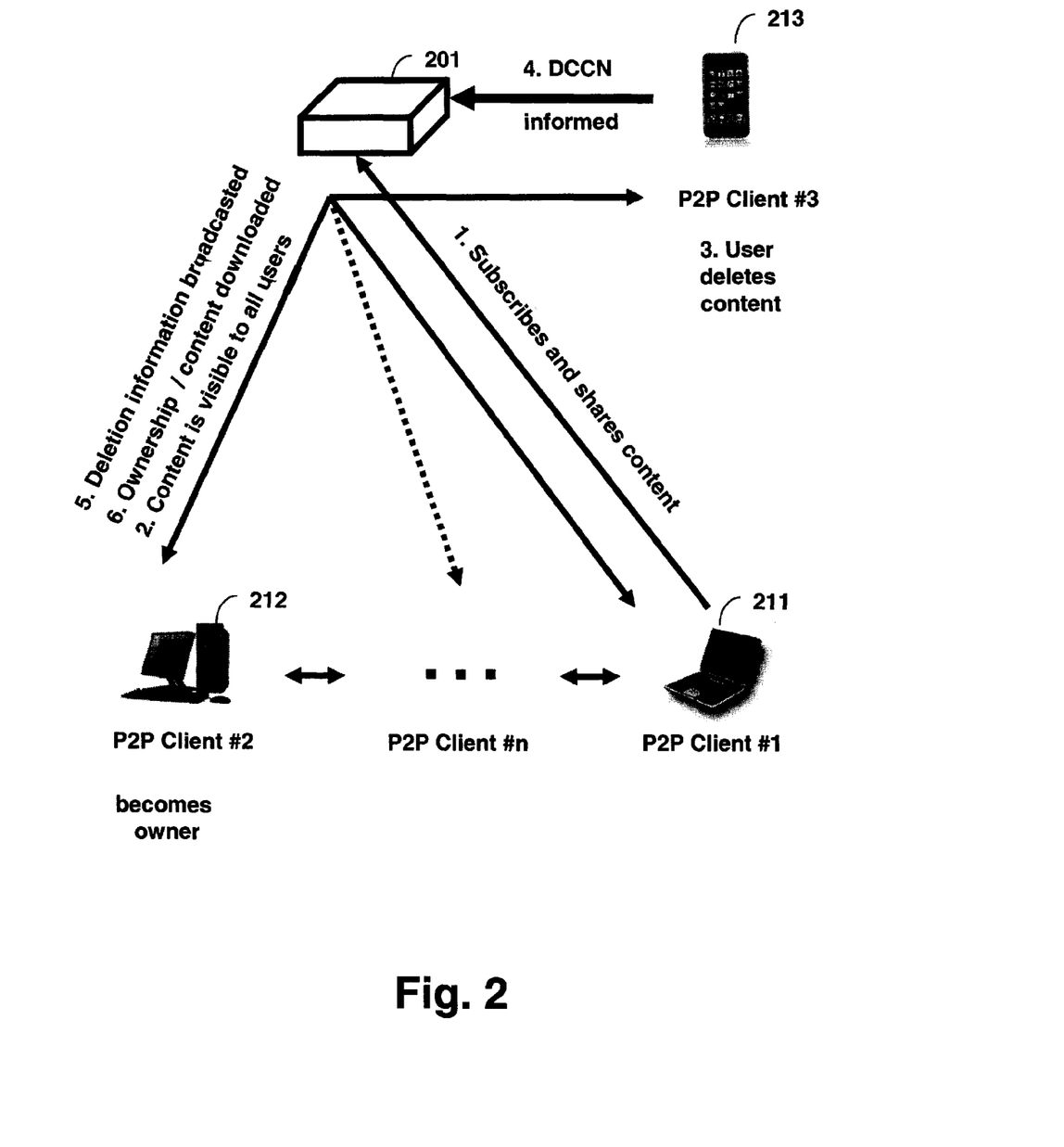
FIG. 2 illustrates an example of ownership allocation mechanism according to certain embodiments of the invention.

Referring to FIG. 2, a peer-to-peer network according to an embodiment of the invention is shown.

Certain embodiments of the present invention include creating a group of users (a community) based on topology network information, and to ask these users if they are ready to share information in this group/community. Users of the community are then able to subscribe to the service according to embodiments of the invention, to share their contents inside the group and in particular to be informed if any content is moved or deleted.

In other words, according to embodiments of the present invention, a file is stored in the P2P network and when its owner deletes the file, other users can—if they desire so—obtain a copy of the file and subsequently become owners of the file. Some embodiments of the present invention can be seen as a shared and optimized community based storage area.

Embodiments of the present invention define one or a plurality of communities. The communities are a subset of nodes of the network. In one preferred embodiment of the present invention, the selection of nodes is achieved dynamically and automatically (exchanging performance is measured on a regular basis) rather than acquired for ever (one single test at initialization). The prior art provides many QoS methods for such node selection. The node selection has nothing to do with localization; as an example, a node situated in Brazil can present a far better exchanging performance with a node located in Nice (France) than would a node located in Paris (France). But other mechanisms than pure network performance can be taken into account (trust given to a new incoming peer, introduction and recommendation of a peer by another, rating of peers, tests or challenges to pass, etc). Still the preferred embodiment of the present invention focuses on a selection based on network transfer rates, because it is an objective and important criterion. Exchanging performance (e.g., bandwidth, transfer rates, etc.) is to be measured on a regular basis.

As a noticeable consequence, a node can lose its community membership if its exchanging performances become to low (for example under a given threshold; or if abuse is reported, if other peers vote to exclude the node, etc); in this case, the ownership of the file is allocated again by the DCCN server to new incoming members or re-allocated to current members of the community. For a node, accepting the ownership of a particular file means that the node agrees and engages to keep (at least) one exemplary of the particular file. Performing backup operations, ensuring the security and the availability of the particular file to others member nodes is of the responsibility of the engaged node. The node benefits from a selection or performant peers and with a good guarantee to be able to get or restore particular files.

As a static view, the described P2P exchange network includes peer-to-peer clients and servers. It includes an indefinite number of n peer-to-peer clients (such as 211, 212, and 213) which are interacting with each others and (optionally) with a DCCN (Directory Content Community Network) server 201. The number of nodes n varies over time, nodes joining or leaving the network over time. The nodes can be ordinary computers, but also mobile phones, set-up-boxes, laptops, game consoles, GPS, PDAs, etc (any digital device). The DCCN server is a hardware/software device provided with I/O, CPU and memory capabilities; it is observed that, in a preferred embodiment, it is a dedicated device, but it may also occur that it is distributed too (i.e. it is logically implemented, each node having a logical subpart of the device). There can be a single server or a plurality of servers of this kind (synchronized with each other or not). All communications occur via the Internet network 120 in this example (any other network can be used, including mobile telephony network; a combination of networks can be used, possibly varying over time).

The notion of DCCN extends the notion of file index server (101) by the introduction of the "community file sharing". Such an index server handles a set of files (or chunks of files) shared using a P2P network but also manages a set of community of users and owners of contents.

The notion of a community can be widely understood as a list of users owning at least a portion of a given file, where the users sharing the entire file are identified as owners of the content and form the content owner community. A community can also be a group of people sharing the same interest, behaviour related to content (metal music, SciFi videos, etc.). A community is created and managed by a set of users having the associated rights. To add new content to a given community, the user should be part of this community; otherwise community access is restricted to read-only access.

As per the dynamic view: at step 1, a (new) node 211 connects to the network and decides to subscribe to a service presented in the sharing network in accordance to the invention. It is to be determined if its connection performances enable the node to join the sharing community. QoS measures are performed and by applying predetermined thresholds to performance indicators regularly measured in the peer-to-peer network (such as response time or available disk space or available bandwidth) membership is accepted (or rejected, and a refusal message is then returned). In this example, we suppose that the request is accepted. A DCCN server 201 is asked if the request of the node 211 can be accepted. If there is no counter-indication (this point will be later described), the request of the node about joining the community is accepted (the node 211 is incorporated on the dynamic list of members of the service presented in the sharing network). At step 2, files that the node 211 brings to the community are rendered visible to all nodes of the existing community (in the figure, nodes 212 and 213 can see the available files of node 211; the dotted line illustrates that other nodes of the community can also get visibility of available files). The DCCN server, as an intermediary, either locally caches the list of files of nodes of the community or it provides IP addresses of nodes to the incoming node; the nodes of the community communicate their respective list of files upon request. At step 3, an event occurs: a given peer (node of the community) wants to delete (or deletes) an exemplary of the file (by accident or voluntarily) in the "shared folder"; the node can either delete the file or move it to another location on the hard-drive, in which location the file isn't seeded anymore. In other words, the community of peers is informed of the termination of availability of file seeding of the particular file. At step 4, the DCCN is informed of such an attempt of deletion (or effective deletion or move). The DCCN server optionally counts the number of exemplary and if this figure is under a predetermined threshold it makes sure to duplicate enough the file over the network. The DCCN tries to allocate the ownership of the (or each) exemplary(ies) by informing nodes of the community of a newly available slot(s) of file ownership. If a node (or a plurality of nodes) of the community (for example the node 212 of FIG. 2) agrees to take ownership of the file, the file is downloaded from the deleting 213 (or from the DCCN server if a cache copy is available) to the hard drive or the memory of the node 212; after the downloads completes, the node 212 is responsible for keeping the file available to others. Loss of files may occur (errors while downloading, deletion without recovery, etc) and in this case, the DCCN (eventually with the deleting node trying to avoid banishment) may try to recover other existing copies elsewhere in the network. Setting a threshold policy/minimum number of copies is a good practice to avoid such situations. The modified P2P system, with elected nodes and distributed storage, ensures a resilient storage and effective exchange rate.

According to certain embodiments of the present invention, the reference that is associated with a particular shared file can be maintained in many ways. In one preferred embodiment of the present invention, there is a central server which maintains a table or database. In others embodiments of the present invention, this reference is collaboratively maintained by peers of the community.

There are many ways to inform the peers of the termination of the availability of a file seeding. In one embodiment of the present invention, for example, the peer can warn before stopping to seed, by sending messages; each of the messages being a dedicated message or being embedded in a message intended for another communication, etc). Alternatively, the peer (the seeder) can avoid doing so and a weakness in the availability of its seeding resources can be detected or even anticipated (if measured, by some control operations). Other peers can also send warning message(s). The stop in the file seeding can also be imminent or it can be realized before warning messages are sent.

A P2P file deletion in such a context requires that all content owners and community members agree on such an action to be completed. First, when a file deletion is done locally by a user, the file status (FIG. 3) is set to "deletion requested"; an alert is sent to all content owners and subscribers of this content; the users can either accept the replication of the content to their shared local storage system or reject it. The replication of such a file is managed because of predetermined policies taking into account the number of nodes having this content their network metrics (bandwidth, response time, disk space, etc.) If none (or not enough) content owners and/or subscribers of this content agree to replicate it, the alert is propagated to the members of the community by following the same process (acceptance, rejection, etc). The objective remains to ensure the content persistence for the community (content owners and subscribers, community members). After a given elapsed time, the content is either replicated on at least one other node or is declared "no more available" (and then removed from the index servers and communities). The synchronization of content changes is done the same way P2P index servers are updated.

Other embodiments of the present invention can include:

1) According to the network topology, a Directory Content Community Network (CCN) or a community or peers is created. Network topology refers to measures related to bandwidth, response time and disk space.

2) Peers that are interested in sharing files can subscribe to the service described the present invention.

3) In a preferred embodiment, links to the files of the users of the community are exported in the Content Community Network (CCN) and visible to all the users of the Community. "Links" means coordinates or network addresses. Optionally, the file itself (or files) of the users is exported in the CCN (i.e. data caching). Optionally a DCCN server can be used (otherwise the database is distributed over the CCN, for example with cache copies stored on each P2P client, the cache copies being updated according to events occurring in the network). In a preferred embodiment, the P2P client can allocate a storage space for such community based replication processes to be done safely. According to this embodiment, a shared file deleted by a user is moved to this dedicated location until another peer node replicates it.

4) For each shared file, each peer of the community is able to mention if:
   download is desired (standard P2P)
   if the "proprietary" peer or "owner" peer (associated with the ownership of the particular file) deletes the particular file (for example node 213), the user (for example node 212) wants to be informed (and optionally will be transmitted a copy of the particular file). Optionally, the considered peer (for example node 212) can declare his agreement for becoming in the future the owner of the file, if it happens that the particular file is deleted.

5) If a peer deletes a particular shared file, the DCCN P2P client (for example 213) pools the CCN Directory (for example stored in the DCCN server 201) to know which user (or users) of the community is interested by this file. Peers are asked of taking ownership of the particular file. Each peer can accept or refuse.

6) In case of conflict (where there are several interested peers for example), in a preferred embodiment, only one peer can download the particular file depending on space disk available (this will optimize storage space). This can be achieved in FIFO mode (first peer to ask is declared owner) but it can include other criteria. In other embodiments of the present invention, a plurality of peers of the community will be able to or authorized to cache a copy of the particular file or content.

7) The particular file is downloaded by a peer and the CCN directory is updated.

FIG. 2 only provides an example. Peer-to-peer networks can be much more complex.

Because communications occur over Internet networks (or a combination of various networks, the combination varying over time), for security purposes, when responding to the community model, it is advised to use encryption keys between nodes of the community. The use of TOR or anonymity mechanisms or of proxy-bouncing is also possible.

Private P2P networks enable users to choose their buddies or partners, a priori not optimized from a networking performance point of view; and in these systems, the content management still depends on users' behaviours. With open networks, the same objections are valid: peers are not necessarily optimized by default (though users can manually define preferred peers) and content management is up to users. According to certain embodiments of the present invention, the performance and content management is optimized.

Figure 3:
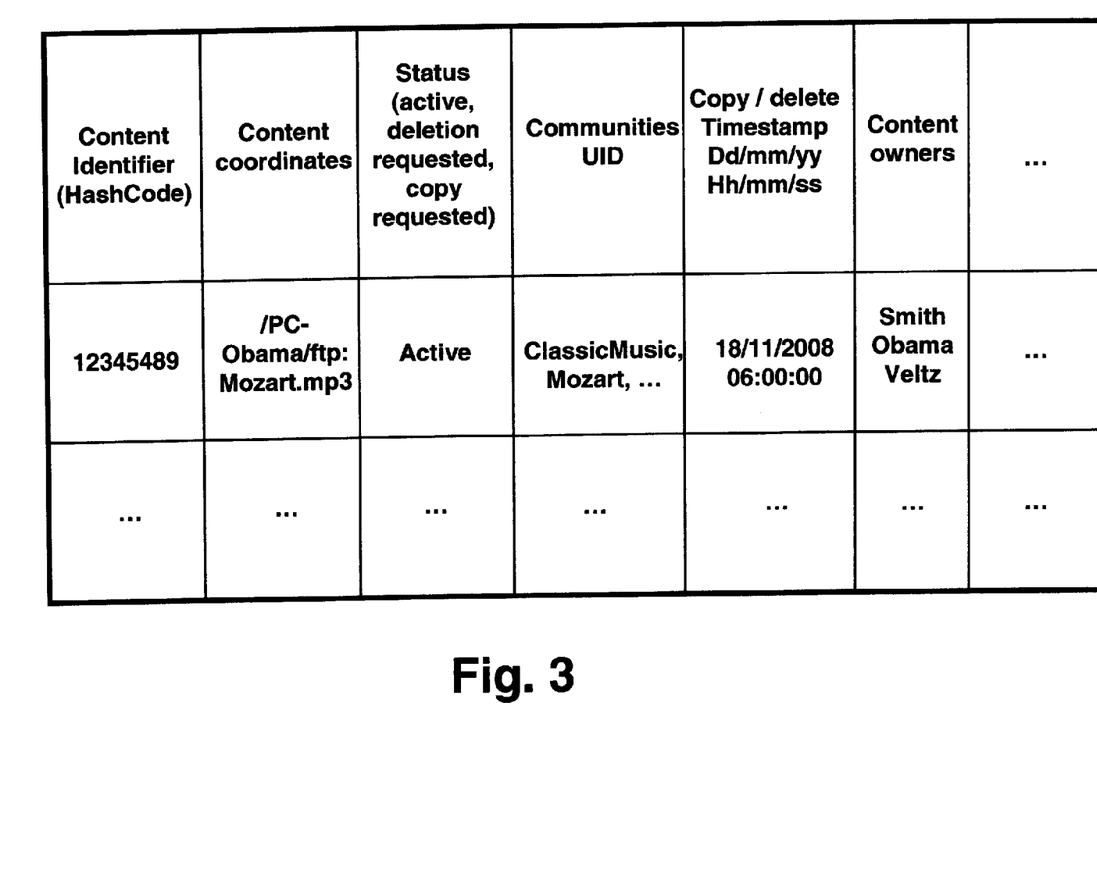
FIG. 3 details the user table of the Directory Content Community Network server.

FIG. 3 details the user table of the Directory Content Community Network. The figure shows an example of a table which can be used by certain embodiments of the present invention.

The table contains several columns: each shared file is associated with a unique content identifier, with an URL (or any kind of network address, such as IP addresses, directory paths, etc), with a status (active, deletion requested, copy requested) and with a list of subscribers.

In the example, the content is a music file named mozart.mp3 and is identified by the number 12345489 representing a unique content identifier; it is available at the path /PC-Obama/ftp:mozart.mp3 (one placement of the file is shown here but some or all addresses can be recorded); the file is associated with three owners in the example: in particular user "Obama" is a registered user. The "Community" column refers to all communities where this content is linked to. The fifth column "Delete or Copy request/timestamp" column allows the index server to manage the completion of the replication process (abort, retry, abandon, etc.). The dots in the table indicate that there are many other similar records of similar files.

The DCCN server 201 maintains this list accurate; any change occurring is reflected in the table. For example if user "Obama" wants to delete the file from its hard drive, the DCCN is informed, the status is changed from "active" to "delete". In this case the reallocation mechanism starts. The mechanism includes the step of determining a list of suitable peers, sending a request to the peers, recording at least one acceptation, updating the user table of FIG. 3. The DCCN can be informed by several equivalent means. In a preferred embodiment, the user sends a message to the DCCN server previously to delete a file. In others embodiments, there is used a software daemon which monitors such deletions (a daemon can be integrated with the P2P software client or it can be implemented as a plug-in or even as an independent application).

Figure 4:
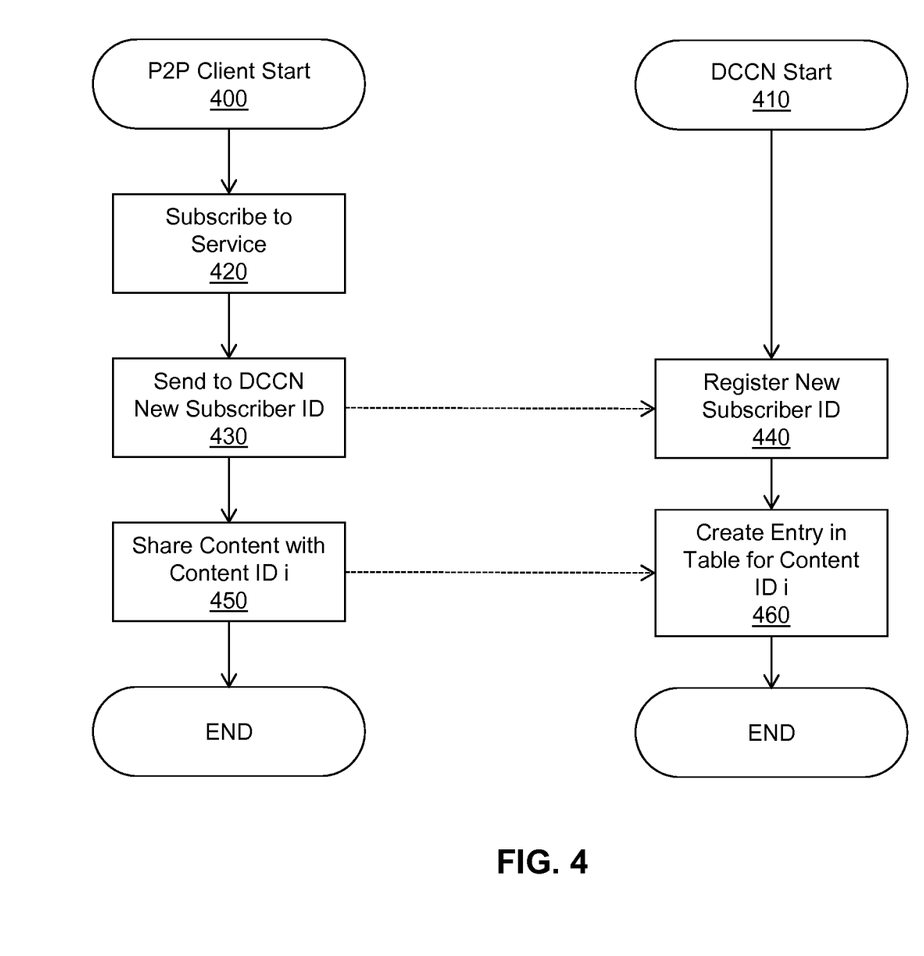
FIG. 4 presents a flowchart representing the interaction between a P2P client and the DCCN server.

FIG. 4 presents a flowchart representing the interaction between a P2P client and the DCCN server.

At step 400, a P2P client starts. At step 410, a DCCN server starts. At step 420, the considered P2P client subscribes to the service of the file sharing community according to embodiments of the present invention. At step 430, the P2P client sends a new subscriber ID to the DCCN server, which is registered at step 440. The P2P client shares its contents (with content ID number i) at step 450 and at step 460, the DCCN server creates an entry in the table for the content ID number i.

Figure 5:
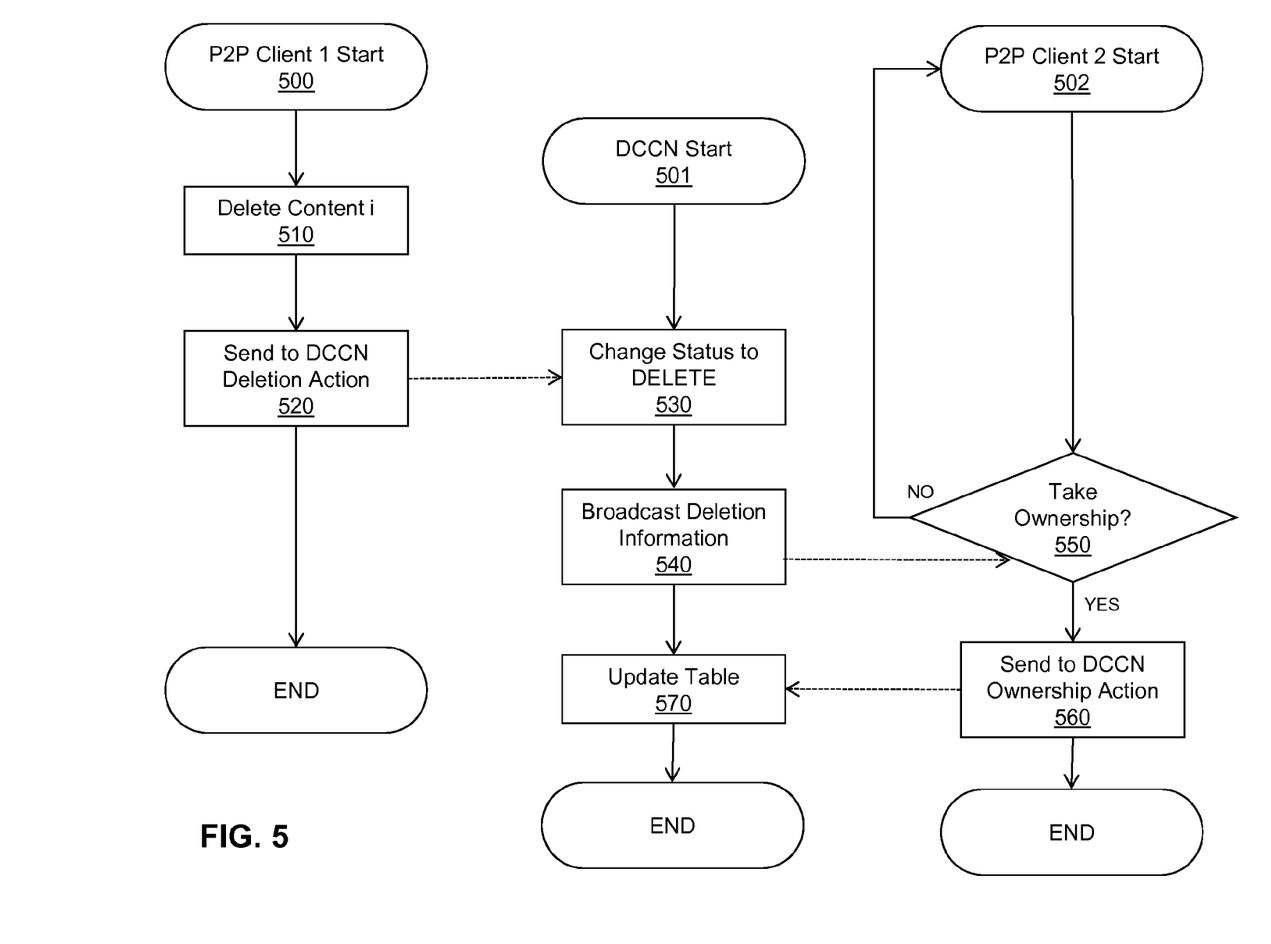
FIG. 5 shows a flowchart according to embodiments of the invention.

FIG. 5 shows a flowchart according to embodiments of the invention.

At step 500 a P2P client 1 starts. At step 501, a DCCN server starts. At step 502 a P2P client 2 starts. At step 510, the P2P client 1 deletes content i; the DCCN is informed of the deletion action at step 520; the DCCN server changes the status in the user table at step 530 then the deletion event is "broadcasted" to each user of the community at step 540; the P2P client 2 accepts the ownership of the content i at step 550; the P2P client 2 then alerts the DCCN server of its ownership action, which in turn updates its user table at step 570. As a result, in this example, the owner (seeder) of the file has changed. As emergent properties, the method allows for the maintenance of a sufficient number of owners.

According to certain embodiments of the present invention, data is flagged in a way that will further lead to an archiving (or not) by the community (which remains autonomous and independent).

Certain embodiments of the present invention contains a model which can be applied to many systems, of various scales, from large distributed systems over the world to an internal architecture (where elements of a given system take the responsibility of particular other elements, mutually gaining from the distributed responsibility/ownership).

Certain embodiments of the present invention provide several options for allocating responsibilities: social interactions may lead a first user to ask a second user for taking ownership; a first user may also refuse this ownership to one or a list of identified other users; the first user may wish to keep the ownership for its own; automatic allocations may lead to allocate ownership slots to nodes presenting sufficient exchanging performance, the performance being measured relatively for the particular file (for example a file which sharing history shows that it is mostly exchanged in Brazil will be attributed to a node presenting good exchanging performance with Brazilian nodes); other criteria may be used (such as rating of a node, reputation, or any combination of these kind of parameters).

Certain embodiments of the present invention can be seen as being a compromise between technologies related to opposed universes: private file sharing groups and open file sharing groups. Certain embodiments of the present invention combine an analysis of the topology of the network with social interactions and an original ownership allocation mechanism.

Certain embodiments of the present invention enable the repair of files containing errors. If an error is detected in a shared file, the distributed ownership allows for the possibility of reconstruction of an error-free original file by gathering the most possible exemplary of the file and restoring missing data (filling data holes, comparisons of data, frame insertion, etc). The finding such examples is facilitated by the ownership policy.

A file can be associated with different levels of ownership. A file can be restricted to "zero-ownership" (i.e., it corresponds to an interdiction of caching the file). A file may also be imposed to an "all-ownership" requirement, meaning that all nodes of the community are required to maintain a copy of the considered file (for example core system files). If the file is locally modified, then the proposed model requires restoring the correct copy of the considered file. As intermediary situations, a file optionally can be associated with a certain number of required duplicates. The duplicates are then distributed over the network. This model can be applied in many applications, either to enhance memory or to organize forgetfulness. For example, the present model can be applied to the collaborative management of bookmarks (a user associates a flag to a bookmark which leads the community to archive the content of the URL and not only the URL address only).

A node/user/peer can take ownership of a unique (and entire) file, but it is also possible for a plurality of users to share shared responsibility and ownership of one unique file (being divided in a plurality of subparts, eventually with overlap and/or redundancy). Also, nothing prevents a node/user/peer to take ownership of a plurality of files. This is likely to be the case because of the greater number of files (than nodes). Certain embodiments of the present invention provide greater flexibility because of the possible combinations of the different models (1 peer responsible for n files; n peers responsible for 1 file; n peers responsible for m files). It should be observed that n peers can be owners of n subparts (or chunks) of the file with overlaps or not; also n peers can be owners of p subparts (or chunks) of the file, with n being superior, inferior or equal to p. The number of exemplary can make use of thresholds, enhancing the robustness of the system.

Being part of the community can be seen as a control mechanism. Peers themselves can control other peers. Word-of-mouth is powerful and rating mechanisms have proved to result in trustable networks. Taking ownership of at least one file can be seen as a condition for being part or accepted in the Content Community Network. Alternatively, this need not be a condition or a prerequisite (in certain embodiments of the present invention; users, as owners, can gain other advantages, such as priority rights in transfers or credentials or any other service of the network possibly unrelated with the particular shared file).

Further embodiments of the present invention can manage file versioning (a file can be re-encoded, using a different codec; it is desirable to maintain different versions given the multiplicity of devices. On the contrary, it may be desirable to reduce the number of versions; very often hash values of files allow for the coexistence of very similar files that have very minor differences (a single pixel difference leads to a different MD5 or SHA-1).

In reference to "Node control", it is possible to implement fine-grained mechanisms (deciding whether a node is valid or invalid, re-encode node events, detect a compromised or attacked node, etc.) A certain number of thresholds can be implemented (number of copies, type of files, etc).

According to an embodiment of the present invention, a method and system of content management in a peer-to-peer file sharing network having a community of peers includes the steps of informing a server of a first peer of the community of peers deleting a particular shared file from a hard drive associated with the first user; a second peer declaring ownership of the particular shared file; the second peer taking ownership of the particular shared file by permanently maintaining the seeding of the particular shared file for the benefit of other peers of the community of peers. The second peer can volunteer for taking ownership or can be designated to be the owner of the particular shared file. If the second peer deletes the particular shared file, (definitive or temporary) mechanisms of banishment or exclusion are part of the proposed system. The community of peers is defined automatically from the peers of the network by analyzing the network performances or is obtained from volunteer subscriptions to the community.

The robustness of the system can be optimized: exchanges can be optionally secured. Handling encrypted sessions (SSL for example) appears to be an interesting possibility if combined with embodiments of the invention. The idea is that in order to accept to serve contents, a node could check the integrity of contents delivered to him.

The invention can take form of an entirely hardware embodiment, an entirely software embodiment or an embodiment containing both hardware and software elements. In a preferred embodiment, the present invention is implemented in software, which includes but is not limited to firmware, resident software, microcode, etc. In a high performance system, a hardware implementation of the virtualization mechanism bundled with image generation processing may prove advantageous for example.

Furthermore, the invention can take the form of a computer program product accessible from a computer-usable or computer-readable medium providing program code for use by or in connection with a computer or any instruction execution system. For the purposes of this description, a computer-usable or computer-readable can be any apparatus that can contain, store, communicate, propagate, or transport the program for use by or in connection with the instruction execution system, apparatus, or device.

What is claimed is:

1. A computer-implemented method of administering a peer-to-peer file sharing computer network, said method comprising:
    maintaining a reference associating a particular shared file with a seeder in a community of peers and a number of seeders in said community of peers;
    broadcasting, by the seeder, a deletion of the particular shared file by the seeder;
    receiving, from a second peer, in response to the broadcast of the deletion of the particular shared file by the seeder, a notification that the second peer offers to take ownership of the particular shared file deleted by the seeder; and
    registering the second peer as a second seeder of said particular shared file.

2. The method according to claim 1, further comprising informing said peers of said community of peers if said number of seeders falls below a predetermined number of seeders.

3. The method according to claim 1, wherein said second peer has volunteered to seed said particular shared file.

4. The method according to claim 1, wherein said second peer has been designated to seed said particular shared file.

5. The method according to claim 1, further comprising said second peer downloading said particular shared file from at least one of other peers in the community of peers or from a server interacting with the community of peers.

6. The method according to claim 1, further comprising excluding said second peer being from said community of peers.

7. The method according to claim 1, wherein said termination of deletion of said particular shared file is detected by monitoring said seeder.

8. The method according to claim 1, wherein said community of peers is obtained by selecting a plurality of peers among peers of said peer-to-peer file sharing computer network and by applying predetermined thresholds to a performance indicator regularly measured in said peer-to-peer network, and wherein said indicator is a response time, an available disk space, or an available bandwidth.

9. The method according to claim 1, wherein a condition for a peer to join said community of peers is seeding a file.

10. A computer-implemented system for administering a peer-to-peer file sharing computer network by performing actions comprising:
 maintaining a reference associating a particular shared file with a seeder in a community of peers and a number of seeders in said community of peers;
 broadcasting, by the seeder, a deletion of the particular shared file by the seeder;
 receiving, from a second peer, in response to the broadcast of the deletion of the particular shared file by the seeder, a notification that the second peer offers to take ownership of the particular shared file deleted by the seeder; and
 registering the second peer as a second seeder of said particular shared file.

11. The system according to claim 10, the actions further comprising informing said peers of said community of peers if said number of seeders falls below a predetermined number of seeders.

12. The system according to claim 10, wherein said second peer has volunteered to seed said particular shared file.

13. The system according to claim 10, wherein said second peer has been designated to seed said particular shared file.

14. The system according to claim 10, the actions further comprising said second peer downloading said particular shared file from at least one of other peers in the community of peers or from a server interacting with the community of peers.

15. The system according to claim 10, the actions further comprising excluding said second peer being from said community of peers.

16. The system according to claim 10, wherein said deletion of said particular shared file is detected by monitoring said seeder.

17. The system according to claim 10, wherein said community of peers is obtained by selecting a plurality of peers among peers of said peer-to-peer file sharing computer network and by applying predetermined thresholds to a performance indicator regularly measured in said peer-to-peer network, and wherein said indicator is a response time, an available disk space, or an available bandwidth.

18. The system according to claim 10, wherein a condition for a peer to join said community of peers is seeding a file.

19. A computer program product, stored on a non-transitory computer readable medium, for administering a peer-to-peer file sharing computer network, the computer program product comprising computer program instructions for:
 maintaining a reference associating a particular shared file with a seeder in a community of peers and a number of seeders in the community of peers;
 broadcasting, by the seeder, a deletion of the particular shared file by the seeder;
 receiving, from a second peer, in response to the broadcast of the deletion of the particular shared file by the seeder, a notification that the second peer offers to take ownership of the particular shared file deleted by the seeder; and
 registering the second peer as a second seeder of the particular shared file.

\* \* \* \* \*